United States Patent [19]

Arakawa et al.

[11] 4,251,641

[45] Feb. 17, 1981

[54] LOW SHRINKAGE POLYESTER RESIN COMPOSITIONS

[75] Inventors: Kouji Arakawa; Kanemasa Nomaguchi, both of Hitachi, Japan

[73] Assignee: Hitachi Chemical Company, Ltd., Tokyo, Japan

[21] Appl. No.: 100,048

[22] Filed: Dec. 4, 1979

[51] Int. Cl.$^3$ .............................................. C08L 67/00
[52] U.S. Cl. ........................................ 525/36; 525/34; 525/444; 525/445
[58] Field of Search ................... 525/34, 36, 444, 445

[56] References Cited

U.S. PATENT DOCUMENTS 3,489,707   1/1970   Fry ........................................ 525/36

Primary Examiner—J. Ziegler

Attorney, Agent, or Firm—Frishauf, Holtz, Goodman & Woodward

[57] ABSTRACT

Unsaturated polyester resin compositions that have a low shrinking property, and at the same time, an enough strength are provided. The compositions comprises (1) 30-70 parts by weight of an unsaturated polyester obtained by reactin terephthalic acid and/or isophthalic acid and one or more of unsaturated acids selected from the group consisting of maleic anhydride, maleic acid and fumaric acid, with a glycol, and having the unsaturation degree of 1.5-5.0 and the acid value of 18-40, (2) 70-30 parts by weight of $\alpha,\beta$-ethylenically unsaturated monomer, and (3) 5-30 parts by weight of an amorphous linear saturated polyester resin obtained by reacting terephthalic acid and/or isophthalic acid with a glycol component.

2 Claims, No Drawings

LOW SHRINKAGE POLYESTER RESIN COMPOSITIONS

BACKGROUND OF THE INVENTION

The invention relates to unsaturated polyester resins having a low volume shrinking property upon curing.

Unsaturated polyester resins have a high shrinkage rate upon curing, amounting to 7–11% of volume shrinkage.

Molded articles that an unsaturated polyester resin, admixed and blended with a glass fibre or a filler such as calcium carbonate, are press-molded or injection-molded tend to cause curvature due to distortion, cracks, sink marks or blooming of the glass fibre. Such phenomena are often ascribed to the shrinkage of unsaturated polyester resin upon curing.

In order to solve the problems, there has heretofore been suggested to decrease the shrinkage of resin compositions upon curing by using a highly unsaturated polyester resin in combination with a thermoplastic resin such as vinyl polymers, e.g. polystyrene or polymethyl methacrylate, or saturated polyester resins, as disclosed in Japanese Patent Published Specification No. 46-41709. It is certainly possible to decrease the shrinkage rate of shaped articles by using a highly unsaturated polyester resin and by exerting fully the shrinkage-decreasing effect of a thermoplastic resin. On the other hand, however, the strength of shaped articles decreases generally by incorporation of a thermoplastic resin, down to about 70–80% when compared with ones containing no plastic resin. Further, the strength of unsaturated polyester resin itself, as well as its tenacy, decrease due to the fact that a highly unsaturated resin, in which more than 70 molar percent of acid component are unsaturated acid like maleic anhydride, has to be used.

BRIEF EXPLANATION OF THE INVENTION

The invention is, therefore, to provide low shrinkage unsaturated polyester resin compositions having a higher strength than known shaped articles, even when a thermoplastic resin is incorporated therein. The invention is related to low shrinkage unsaturated polyester resin compositions which comprises (1) 30–70 parts by weight of an unsaturated polyester, whose unsaturation degree (i.e. moles of unsaturated acid contained in 1,000 g. of unsaturated polyester) is 1.5–5.0 and the acid value is 18–40, obtained by reacting terephthalic acid and/or isophthalic acid, and one or more of unsaturated acids selected from the group consisting of maleic anhydride, maleic acid and fumaric acid, with a glycol, (2) 70–30 parts by weight of an $\alpha,\beta$-ethylenically unsaturated monomer, and (3) 5–30 parts by weight of an amorphous linear saturated polyester resin obtained by reacting terephthalic acid and/or isophthalic acid with a glycol component.

The invention is, therefore, to provide low shrinkage unsaturated polyester resin compositions which show a less decrease in the strength by using above-mentioned unsaturated polyester obtained by reacting an acid component comprising terephthalic acid and/or isophthalic acid and one or more of unsaturated acids selected from the group consisting of maleic anhydride, maleic acid and fumaric acid, with a glycol component, in combination with the above-mentioned amorphous linear saturated polyester resin.

DETAILED DESCRIPTION OF PREFERRED EMBODIMENTS OF THE INVENTION

The unsaturated polyesters of the invention may be obtained by using, as the acid components, either or both of terephthalic acid and isophthalic acid, and one or more of maleic anhydride, maleic acid and fumaric acid; and as the glycol component, ethylene glycol, diethylene glycol, propylene glycol, dipropylene glycol, butylene glycol, neopentyl glycol, hexylene glycol, hydrogenated bisphenol A, 2,2'-di(4-hydroxypropoxyphenyl)propane, 2,2'-di(4-hydroxyethoxyphenyl)propane, or the like.

The unsaturation degree, i.e. moles of unsaturated acid contained in 1,000 g. of unsaturated polyester, should be confined to 1.5–5.0. The unsaturation degree of less than 1.5 will give insufficient shrinkage-decreasing effect of thermoplastic resin, whereas that of more than 5.0 will no longer improve the strength of unsaturated polyester resins due to less content of saturated acid (i.e. terephthalic acid and/or isophthalic acid). Use of terephthalic acid and/or isophthalic acid as the saturated acid will give the low shrinkage effect in full.

The acid value of unsaturated polyester should be 18–40. The acid value of less than 18 will give an insufficient shrinkage-decreasing effect, whereas that of more than 40 will no longer improve the strength of unsaturated polyester resin.

$\alpha,\beta$-Ethylenically unsaturated monomers to be used in the invention include styrene, vinyltoluene, divinylbenzene and diallyl phthalate.

In this invention, amorphous linear saturated polyester resins obtained by reacting terephthalic acid and/or isophthalic acid, as the acid components, with the above-mentioned glycol component, i.e. those having the number average molecular weight of 3,000–20,000, for example, Bylon 200 and Bylon 300 (both available from Toyobo Co., Ltd.) are preferably employed.

In this invention, the amounts of unsaturated polyester and of $\alpha,\beta$-ethylenically unsaturated monomer should be 30–70 parts by weight and 70–30 parts by weight, respectively.

Use of less than 30 parts by weight of unsaturated polyester will cause a high shrinkage upon curing ascribed to the $\alpha,\beta$-ethylenically unsaturated monomer, that will not be compensated by the use of an amorphous linear saturated polyester resin, whereas use of more than 70 parts by weight of unsaturated polyester will decrease the amount of heat generated upon curing and impair the shrinkage-decreasing effect of thermoplastic resin. The total amount of unsaturated polyester and $\alpha,\beta$-ethylenically unsaturated monomer should be 100 parts by weight.

The amount of amorphous linear saturated polyester resin should be confined to 5–30 parts by weight. Use of less than 5 parts by weight will give an insufficient shrinkage-decreasing effect, whereas use of more than 30 parts by weight will give an insufficient strength of shaped articles, although the shrinkage-decreasing effect may be attained.

The low shrinkage unsaturated polyester resin compositions of the invention may be cured with a hardener, such as methyl ethyl ketone peroxide, t-butyl perbenzoate and benzoyl peroxide.

The resin compositions of the invention may contain, if necessary, fillers such as calcium carbonate, talc, silica sand, silicic acid, aluminum hydroxide and barium sulfate. They may also contain reinforcements such as glass fibre, carbon fibre and organic fibres. Furthermore, they may contain pigments or plasticizers, depending on the objects they are used for.

By using the low shrinkage unsaturated polyester resin compositions of the invention, it becomes possible to prepare shaped articles having a low shrinkage rate upon shaping, high strength, and a good, smooth surface.

The invention is further explained by the following non-limiting examples.

EXAMPLE 1.

(1) An unsaturated polyester obtained from 1.10 moles of propylene glycol, 0.5 mole of maleic anhydride and 0.5 mole of terephthalic acid, and having the acid value of 30 and the unsaturation degree of 2.7 was made into a 70% by weight styrene solution (A).

(2) An unsaturated polyester obtained from 1.10 moles of propylene glycol and 1.0 mole of maleic anhydride, and having the acid value of 30 and the unsaturation degree of 6.1 was made into a 70% by weight styrene solution (B).

(3) Bylon 300 (an amorphous linear saturated polyester resin, available from Toyobo Co., Ltd.) was dissolved in styrene to make a 60% by weight styrene solution (C).

Each resin solution was admixed with an inorganic filler to make a bulk-molding compound and the characteristics thereof were determined. The results are shown in Table 1.

TABLE 1

| Material | | Example 1 | Comparison 1 | Comparison 2 |
|---|---|---|---|---|
| unsaturated polyester resin | | solution (A) 70 | solution (B) 70 | solution (B) 100 |
| solution (C) | | 30 | 30 | — |
| calcium carbonate | | 150 | 150 | 150 |
| zinc stearate | | 2 | 2 | 2 |
| benzoyl peroxide | | 2 | 2 | 2 |
| ¼ inch glass fibre | | 20 | 20 | 20 |
| characteristics* | shrinkage rate upon shaping** (%) | +0.05 | +0.05 | −0.8 |
| | bending strength (kg/mm$^2$) 23° C. | 8.0 | 4.0 | 8.0 |
| | 100° C. | 4.0 | 1.0 | 3.5 |

*shaping conditions:
temperature, 140° C.
pressure, 30 kg/cm$^2$
period, 3 minutes
**according to Japanese Industrial Standard K 6911

As will be evident from Table 1, the composition for shaping in which the resin composition of the invention was used shows the shrinkage rate upon shaping comparable to that when a highly unsaturated resin was used, and the strength comparable to that when no shrinkage-decreasing material was used.

EXAMPLE 2.

(1) An unsaturated polyester obtained from 0.50 mole of propylene glycol, 0.55 mole of neopentyl glycol, 0.5 mole of maleic anhydride and 0.5 mole of terephthalic acid, and having the acid value of 30 and the unsaturation degree of 2.5 was made into a 70% by weight styrene solution (D).

(2) An unsaturated polyester obtained from 0.50 mole of propylene glycol, 0.55 mole of neopentyl glycol and 1.0 mole of maleic anhydride, and having the acid value of 30 and the unsaturation degree of 5.7 was made into a 70% by weight styrene solution (E).

(3) Bylon 200 (an amorphous linear saturated polyester resin, available from Toyobo Co., Ltd.) was dissolved in styrene to make a 60% by weight styrene solution (F).

Each resin solution was admixed with an inorganic filler to make a bulk-molding compound, and the characteristics thereof were determined. The results are shown in Table 2.

TABLE 2

| Material | | Example 2 | Comparison 3 | Comparison 4 |
|---|---|---|---|---|
| unsaturated polyester resin | | solution (D) 70 | solution (E) 70 | solution (E) 100 |
| solution (F) | | 30 | 30 | — |
| calcium carbonate | | 150 | 150 | 150 |
| zinc stearate | | 2 | 2 | 2 |
| benzoyl peroxide | | 2 | 2 | 2 |
| ¼ inch glass fibre | | 20 | 20 | 20 |
| characteristics* | shrinkage rate upon shaping** (%) | +0.06 | +0.06 | −0.5 |
| | bending strength (kg/mm$^2$) 23° C. | 9.0 | 5.0 | 9.0 |
| | 100° C. | 5.0 | 2.0 | 4.8 |

*shaping conditions:
temperature, 140° C.
pressure, 30 kg/cm$^2$
period, 3 minutes
**according to Japanese Industrial Standard K 6911

As will be evident from Table 2, the composition for shaping in which the resin composition of the invention was used shows the shrinkage rate upon shaping comparable to that when a highly unsaturated resin was used, and the strength comparable to that when no solution (F) was used (Comparison 4).

What is claimed is:

1. A low shrinkage unsaturated polyester resin composition which comprises (1) 30–70 parts by weight of an unsaturated polyester obtained by reacting (a) an acid selected from the group consisting of terephthalic acid, isophthalic acid and mixtures thereof and (b) an unsaturated acid selected from the group consisting of maleic anhydride, maleic acid, fumaric acid, and mixtures thereof with (c) a glycol, said polyester having the unsaturation degree (moles of the unsaturated acids in 1,000 g. of the unsaturated polyester) of 1.5–5.0 and the acid value of 18–40, (2) 70–30 parts by weight of α,β-ethylenically unsaturated monomer, and (3) 5–30 parts by weight of an amorphous linear saturated polyester resin obtained by reacting an acid selected from the terephthalic acid, isophthalic acid and mixtures thereof with a glycol component.

2. The composition according to claim 1, wherein the amorphous linear saturated polyester resin has the number average molecular weight of 3,000–20,000.

* * * * *